(12) United States Patent
Wang et al.

(10) Patent No.: US 11,634,518 B2
(45) Date of Patent: Apr. 25, 2023

(54) RESIN COMPOSITION AND ARTICLE MADE THEREFROM

(71) Applicant: Elite Electronic Material (KunShan) Co., Ltd., Kunshan (CN)

(72) Inventors: Rongtao Wang, Kunshan (CN); Chenyu Shen, Kunshan (CN); Yan Zhang, Kunshan (CN); Xing He, Kunshan (CN)

(73) Assignee: ELITE ELECTRONIC MATERIAL (KUNSHAN) CO., LTD., Kunshan (CN)

( * ) Notice: Subject to any disclaimer, the term of this patent is extended or adjusted under 35 U.S.C. 154(b) by 0 days.

(21) Appl. No.: 17/526,135

(22) Filed: Nov. 15, 2021

(65) Prior Publication Data

US 2023/0091645 A1     Mar. 23, 2023

(30) Foreign Application Priority Data

Sep. 10, 2021   (CN) .......................... 202111065873.7

(51) Int. Cl.
| | |
|---|---|
| *C08F 36/06* | (2006.01) |
| *C08L 9/06* | (2006.01) |
| *C08J 5/24* | (2006.01) |
| *C08L 71/12* | (2006.01) |
| *C08L 25/06* | (2006.01) |
| *C08F 12/12* | (2006.01) |
| *C08F 20/18* | (2006.01) |

(52) U.S. Cl.
CPC .................. *C08F 36/06* (2013.01); *C08J 5/24* (2013.01); *C08L 9/06* (2013.01); *C08F 12/12* (2013.01); *C08F 20/18* (2013.01); *C08L 25/06* (2013.01); *C08L 71/126* (2013.01); *C08L 2201/08* (2013.01); *C08L 2203/16* (2013.01); *C08L 2203/20* (2013.01); *C08L 2205/03* (2013.01)

(58) Field of Classification Search
CPC .. C08F 2201/08; C08F 12/12; C08L 2205/03; C08J 5/24
See application file for complete search history.

(56) References Cited

U.S. PATENT DOCUMENTS

2013/0331477 A1* 12/2013 Ogawa .................. C08F 212/32
                                                                526/284

* cited by examiner

*Primary Examiner* — Mark S Kaucher
(74) *Attorney, Agent, or Firm* — Muncy, Geissler, Olds & Lowe, P.C.

(57) ABSTRACT

A resin composition includes 100 parts by weight of a polyolefin and 20 parts by weight to 150 parts by weight of a homopolymer of Formula (1). The resin composition is useful for making different articles, including a prepreg, a resin film, a laminate or a printed circuit board, which may achieve excellent multi-layer board thermal resistance and thermal resistance after moisture absorption and achieve high glass transition temperature, low dissipation factor, and low Z-axis ratio of thermal expansion.

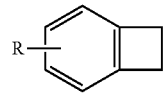

Formula (1)

15 Claims, 1 Drawing Sheet

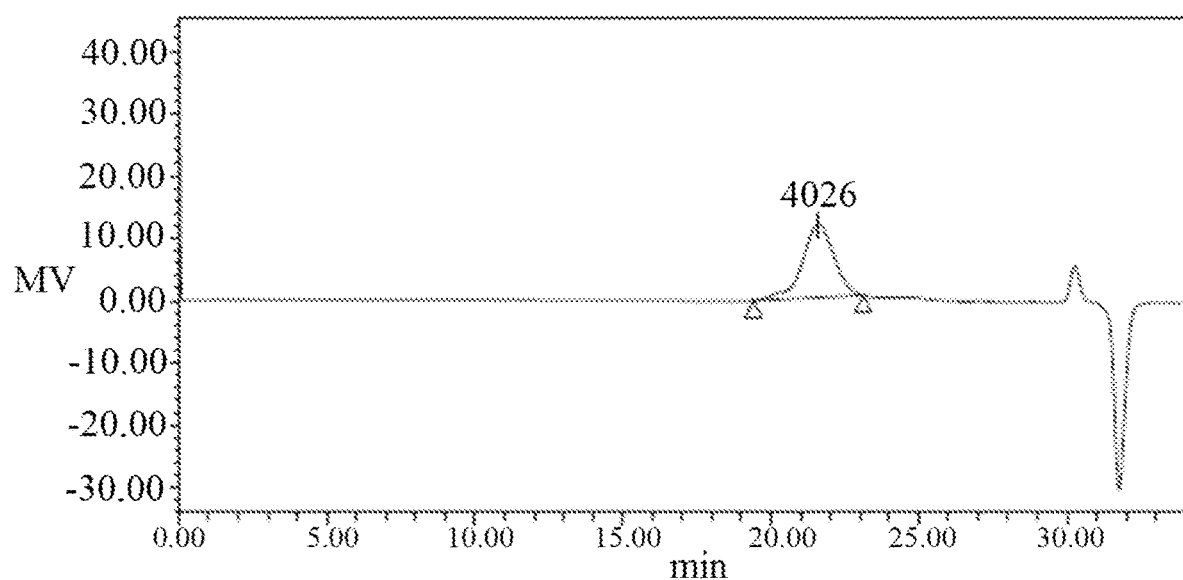

RESIN COMPOSITION AND ARTICLE MADE THEREFROM

CROSS-REFERENCE TO RELATED APPLICATION

This application claims the priority benefits of China Patent Application No. 202111065873.7, filed on Sep. 10, 2021. The entirety the above-mentioned patent application is hereby incorporated by reference herein and made a part of this specification.

BACKGROUND

1. Field of the Disclosure

The present disclosure relates to a resin composition and an article made therefrom and more particularly to a resin composition useful for preparing an article such as a prepreg, a resin film, a laminate or a printed circuit board.

2. Description of Related Art

With the advent of the 5G generation, technology upgrade of printed circuit boards for mobile communication and automobile electronics requires the fundamental insulation materials in printed circuit boards to achieve not only good dielectric properties but also high thermal resistance and high dimensional stability, so as to meet the processability requirements of printed circuit boards involving multiple lamination processes and multiple assembly operations. Conventionally, to achieve desirable dielectric properties, polyphenylene ether or polyolefin was used as the main component and triallyl isocyanurate (TAIC) was used as the auxiliary crosslinking component, and laminates thus obtained achieved better dielectric properties, but these materials failed to meet the growing demands in high thermal resistance, high dimensional stability, and good dielectric properties. Accordingly, there is an urgent need in the present technical field to develop a novel resin material having high thermal resistance, high dimensional stability and good dielectric properties.

SUMMARY

To solve the above-mentioned problems, the present disclosure provides a resin composition, based on 100 parts by weight of a polyolefin, comprising:
(A) 100 parts by weight of the polyolefin; and
(B) 20 parts by weight to 150 parts by weight of a homopolymer of Formula (1),

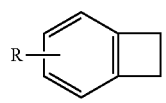

Formula (1)

wherein R is a functional group containing an unsaturated C=C double bond.

As used herein, "a homopolymer of Formula (1)" may also be referred to as a homopolymer of the monomer represented by Formula (1).

Preferably, based on 100 parts by weight of the polyolefin, the resin composition comprises 30 parts by weight to 150 parts by weight of the homopolymer of Formula (1).

Moreover, in the resin composition, the homopolymer of Formula (1) has a number average molecular weight of 800 to 50000.

Furthermore, the homopolymer of Formula (1) has a number average molecular weight of 1000 to 20000.

Optionally, the homopolymer of Formula (1) of component (B) is not particularly limited and may comprise, but not limited to, a homopolymer of Formula (2), a homopolymer of Formula (3), a homopolymer of Formula (4) or a combination thereof:

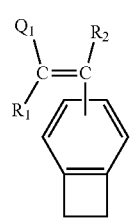

Formula (2)

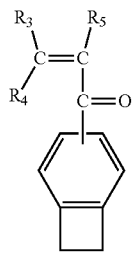

Formula (3)

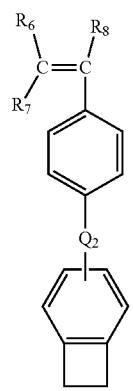

Formula (4)

wherein $R_1$, $R_2$, $R_3$, $R_4$, $R_5$, $R_6$, $R_7$ and $R_8$ independently represent a hydrogen atom, a methyl group or an ethyl group; $Q_1$ is a hydrogen atom, a C1-C10 straight chain hydrocarbyl group, a C1-C10 branched chain hydrocarbyl group or a C3-C10 cyclic hydrocarbyl group; $Q_2$ is a C1-C10 straight chain hydrocarbyl group, a C1-C10 branched chain hydrocarbyl group or a C3-C10 cyclic hydrocarbyl group.

Optionally, the polyolefin of component (A) is not particularly limited and may comprise various olefin polymers known in the art to which this disclosure pertains, such as but not limited to polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, styrene-maleic anhydride copolymer, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof.

Moreover, the resin composition may further optionally comprise 50 parts by weight to 100 parts by weight of an unsaturated C=C double bond-containing polyphenylene ether resin. The unsaturated C=C double bond-containing polyphenylene ether resin is not particularly limited and may comprise various unsaturated C=C double bond-containing polyphenylene ether resins known in the art to which this disclosure pertains, such as but not limited to a vinylbenzyl-containing polyphenylene ether resin, a (meth)acryloyl-containing polyphenylene ether resin, a vinyl-containing polyphenylene ether resin or a combination thereof.

In addition to the polyolefin (component (A)), the homopolymer of Formula (1) (component (B)) and the unsaturated C=C double bond-containing polyphenylene ether resin, the resin composition of the present disclosure may further optionally comprise an unsaturated C=C double bond-containing crosslinking agent which comprises, but not limited to, 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

Moreover, the resin composition may further optionally comprise maleimide resin, benzoxazine resin, epoxy resin, organic silicone resin, cyanate ester resin, active ester, phenolic resin, amine curing agent, polyamide, polyimide or a combination thereof.

Moreover, the resin composition may further optionally comprise flame retardant, curing accelerator, polymerization inhibitor, inorganic filler, solvent, silane coupling agent, surfactant, coloring agent, toughening agent or a combination thereof.

The resin compositions of various embodiments may be useful for making different articles, including but not limited to a prepreg, a resin film, a laminate or a printed circuit board.

In a preferred embodiment, articles made from the resin composition disclosed herein have one, more or all of the following properties:

In one embodiment, the article has a glass transition temperature as measured by using a dynamic mechanical analyzer by reference to IPC-TM-650 2.4.24.4 of greater than or equal to 250° C.

In one embodiment, no delamination occurs after subjecting the article to a multi-layer board thermal resistance test by reference to IPC-TM-650 2.4.13.1.

In one embodiment, no delamination occurs after subjecting the article to a thermal resistance after moisture absorption test by reference to IPC-TM-650 2.6.16.1 and IPC-TM-650 2.4.23.

In one embodiment, the article has a Z-axis ratio of thermal expansion as measured by reference to IPC-TM-650 2.4.24.5 of less than or equal to 0.40%.

In one embodiment, the article has a dissipation factor Df at 10 GHz as measured by reference to JIS C2565 of less than or equal to 0.0017.

BRIEF DESCRIPTION OF THE DRAWINGS

The sole FIGURE illustrates the GPC spectrum of a homopolymer of vinylbenzocyclobutene (PVBCB).

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "encompasses," "encompassing," "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompasses," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer (s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A homopolymer refers to the polymer formed by the polymerization of one monomer. Copolymers comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. For example, a styrene-butadiene copolymer disclosed herein is interpreted as comprising a styrene-butadiene random copolymer, a styrene-butadiene alternating copolymer, a styrene-butadiene graft copolymer or a styrene-butadiene block copolymer. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

Unless otherwise specified, the term "resin" of the present disclosure is a widely used common name of a synthetic polymer and is construed as comprising monomer and its combination, polymer and its combination or a combination of monomer and its polymer, but not limited thereto.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated C=C double bond with the potential of being crosslinked with other functional groups, but not limited thereto.

The unsaturated C=C double bond as used herein preferably comprises, but not limited to, a vinyl group, a vinylbenzyl group, a (meth)acryloyl group, an allyl group or a combination thereof. The term "vinyl group" is construed as comprising a vinyl group and a vinylene group. The term "(meth)acryloyl group" is construed as comprising an acryloyl group and a methacryloyl group.

Unless otherwise specified, an alkyl group and an alkenyl group described herein are construed to encompass various isomers thereof. For example, a propyl group is construed to encompass n-propyl and iso-propyl.

Unless otherwise specified, as used herein, part(s) by weight represents weight part(s) in any weight unit in the resin composition, such as but not limited to kilogram, gram, pound and so on. For example, 100 parts by weight of a polyolefin may represent 100 kilograms of the polyolefin or 100 pounds of the polyolefin.

It should be understood that all features disclosed herein may be combined in any way to constitute the technical solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

For example, the present disclosure provides a resin composition, based on 100 parts by weight of a polyolefin, comprising:
(A) 100 parts by weight of the polyolefin; and
(B) 20 parts by weight to 150 parts by weight of a homopolymer of Formula (1),

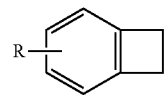

Formula (1)

wherein R is a functional group containing an unsaturated C=C double bond.

Unless otherwise specified, according to the resin composition of the present disclosure, the amount of each component contained in the resin composition is represented as the amount relative to a total of 100 parts by weight of the polyolefin (component (A)), and the amount of the homopolymer of Formula (1) (component (B)) may be 20 parts by weight to 150 parts by weight, 30 parts by weight to 120 parts by weight or 100 parts by weight to 150 parts by weight, preferably 30 parts by weight to 150 parts by weight. If the homopolymer of Formula (1) (component (B)) in the resin composition exceeds 150 parts by weight, articles made from the resin composition will have significantly lowered copper foil peeling strength, which unfavorably affects the application of the articles. If the homopolymer of Formula (1) (component (B)) in the resin composition is less than 20 parts by weight, articles made from the resin composition will have significantly lowered glass transition temperature, which fails to meet the demands.

In some embodiments, the homopolymer of Formula (1) has a number average molecular weight Mn of 800 to 50000, 800 to 1000 or 20000 to 50000, preferably 1000 to 20000. The number average molecular weight Mn may be used to calculate a range of the number (n) of monomer repeating unit, i.e., Formula (1), in the homopolymer; preferably, n is an integer of 3 to 400.

In some embodiments, R in Formula (1) may be a functional group having the structure as below:

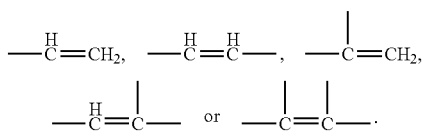

In some embodiments, the homopolymer of Formula (1) comprises a homopolymer of Formula (2), a homopolymer of Formula (3), a homopolymer of Formula (4) or a combination thereof:

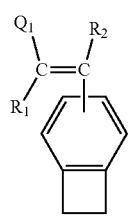

Formula (2)

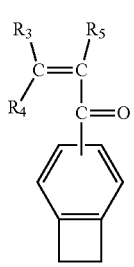

Formula (3)

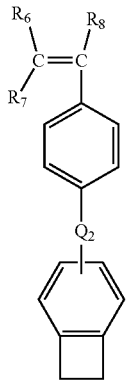

Formula (4)

wherein $R_1$, $R_2$, $R_3$, $R_4$, $R_5$, $R_6$, $R_7$ and $R_8$ independently represent a hydrogen atom, a methyl group or an ethyl group; $Q_1$ is a hydrogen atom, a C1-C10 straight chain hydrocarbyl group, a C1-C10 branched chain hydrocarbyl group or a C3-C10 cyclic hydrocarbyl group; $Q_2$ is a C1-C10 straight chain hydrocarbyl group, a C1-C10 branched chain hydrocarbyl group or a C3-C10 cyclic hydrocarbyl group. Preferably, $Q_1$ is a hydrogen atom, a C1-C3 hydrocarbyl group or a C3 cyclic hydrocarbyl group; $Q_2$ is a C1-C3 hydrocarbyl group or a C3 cyclic hydrocarbyl group.

In some embodiments, R in Formula (1) may be a vinyl group, a (meth)acryloyl group, an allyl group or a vinylbenzyl group.

The polyolefin used in the present disclosure is not particularly limited and may include any one or more olefin polymers useful for making a prepreg, a resin film, a laminate, or a printed circuit board, such as any one or more commercial products, products prepared by the Applicant or a combination thereof.

Examples of the polyolefin disclosed herein include but are not limited to a diene polymer, a monoene polymer, a hydrogenated diene polymer or a combination thereof. The diene refers to a hydrocarbon compound containing two unsaturated C=C double bonds in the molecule, and the monoene refers to a hydrocarbon compound containing one unsaturated C=C double bond in the molecule. The number average molecular weight generally ranges from 1000 to 150000. Because the polyolefin has a higher molecular weight and has a main chain containing regularly arranged carbon-carbon bonds, it has low molecular polarity which can improve the dielectric properties of the cured product.

In some embodiments, examples of the polyolefin include but are not limited to: polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, styrene-maleic anhydride copolymer, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof. These components should be construed as including their modifications.

In some embodiments, the polyolefin is preferably a butadiene-based diene polymer, an isoprene-based diene polymer, a hydrogenated butadiene-based diene polymer, a hydrogenated isoprene-based diene polymer or a combination thereof, examples including but not limited to: polybutadiene, hydrogenated polybutadiene, polyisoprene, styrene-butadiene copolymer, hydrogenated styrene-butadiene copolymer, styrene-isoprene copolymer, hydrogenated styrene-isoprene copolymer, styrene-butadiene-divinylbenzene terpolymer, styrene-butadiene-maleic anhydride terpolymer, hydrogenated styrene-butadiene-divinylbenzene terpolymer, hydrogenated styrene-butadiene-maleic anhydride terpolymer, vinyl-polybutadiene-urethane oligomer, maleic anhydride-butadiene copolymer, or a combination thereof.

In some embodiments, the present disclosure uses the hydrogenated styrene-butadiene block copolymer G1726 available from Kraton, polybutadiene B-3000 available from Nippon Soda and styrene-butadiene-maleic anhydride terpolymer Ricon184MA6 and styrene-butadiene random copolymer Ricon 100 available from Cray Valley.

In addition to the components described above, the resin composition disclosed herein may further optionally comprise an unsaturated C═C double bond-containing polyphenylene ether resin which, based on 100 parts by weight of the polyolefin, may be 50 parts by weight to 100 parts by weight, 50 parts by weight to 80 parts by weight or 80 parts by weight to 100 parts by weight.

The unsaturated C═C double bond-containing polyphenylene ether resin used in the present disclosure is not particularly limited and may include any one or more unsaturated C═C double bond-containing polyphenylene ether resins useful for making a prepreg, a resin film, a laminate, or a printed circuit board, such as any one or more commercial products, products prepared by the Applicant or a combination thereof.

The unsaturated C═C double bond-containing polyphenylene ether resin of the present disclosure has an unsaturated C═C double bond and a phenylene ether skeleton, wherein the unsaturated C═C double bond is a reactive group which may perform self-polymerization under heat and may also perform free radical polymerization with other components containing an unsaturated bond in the resin composition and finally result in crosslinking and curing. The cured product thereof has high thermal resistance and good dielectric properties. Preferably, the unsaturated C═C double bond-containing polyphenylene ether resin comprises an unsaturated C═C double bond-containing polyphenylene ether resin with 2,6-dimethyl substitution in its phenylene ether skeleton, wherein the methyl groups form steric hindrance to prevent the oxygen atom of the ether group from forming a hydrogen bond or Van der Waals force to absorb moisture, thereby achieving better dielectric properties.

Generally, the unsaturated C═C double bond-containing polyphenylene ether suitable for the present disclosure may have a structure of Formula (5):

$$Z\text{---}(O\text{---}L)_a(O\text{---}M\text{---}O)(L\text{---}O)_b Z \quad \text{Formula (5)}$$

wherein a and b are individually an integer of 1 to 30, preferably an integer of 1 to 10, and more preferably an integer of 1 to 5;

—(O-M-O)— has a structure of Formula (6) or Formula (7):

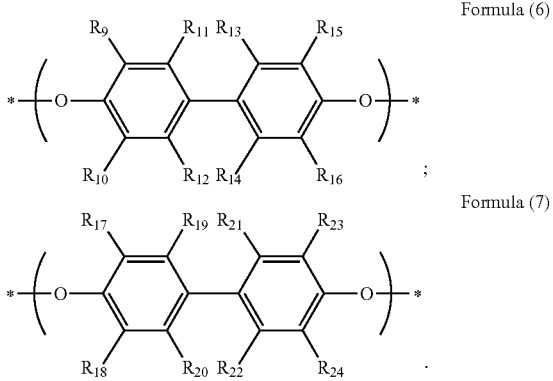

L has a structure of Formula (8):

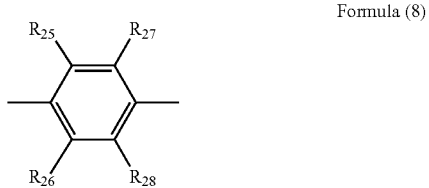

wherein $R_9$, $R_{10}$, $R_{15}$ and $R_{16}$ are the same or different and are individually a halogen atom, a C1-C6 alkyl group or a phenyl group; $R_{11}$, $R_{12}$, $R_{13}$ and $R_{14}$ are the same or different and are individually a hydrogen atom, a halogen atom, a C1-C6 alkyl group or a phenyl group; in some embodiments, $R_9$, $R_{10}$, $R_{11}$, $R_{14}$, $R_{15}$ and $R_{16}$ are individually a methyl group;
$R_{17}$, $R_{18}$, $R_{19}$, $R_{20}$, $R_{21}$, $R_{22}$, $R_{23}$ and $R_{24}$ are the same or different and are individually a halogen atom, a C1-C6 alkyl group, a phenyl group or a hydrogen atom; in some embodiments, $R_{17}$, $R_{18}$, $R_{23}$ and $R_{24}$ are individually a methyl group;
A is a C1-C20 straight chain hydrocarbyl group, a C1-C20 branched chain hydrocarbyl group (e.g., branched chain alkyl group) or a C3-C20 cyclic hydrocarbyl group (e.g., cycloalkyl group), preferably —CH$_2$— or —C(CH$_3$)$_2$—;
$R_{25}$, $R_{26}$, $R_{27}$ and $R_{28}$ are the same or different and are individually a hydrogen atom, a halogen atom, a C1-C6 alkyl group or a phenyl group, preferably individually a hydrogen atom or —CH$_3$;
Z has a structure of Formula (9), Formula (10) or Formula (11):

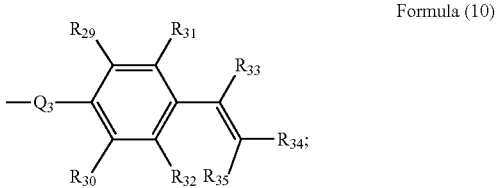

-continued

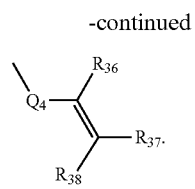

Formula (11)

wherein $R_{34}$ and $R_{35}$ represent a hydrogen atom; $R_{29}$, $R_{30}$, $R_{31}$, $R_{32}$ and $R_{33}$ are the same or different, each representing a hydrogen atom, a halogen atom, an alkyl group or a halogen-substituted alkyl group. The alkyl group is preferably a C1-C6 alkyl group, and the halogen-substituted alkyl group is preferably a halogen-substituted C1-C6 alkyl group; $Q_3$ and $Q_4$ are individually an organic group with at least one carbon atom, wherein the organic group optionally comprises one or more of a hydrogen atom, an oxygen atom, a nitrogen atom, a sulfur atom and a halogen atom. In some embodiments, $Q_3$ and $Q_4$ represent a methylene group (—$CH_2$—). In some embodiments, $R_{29}$ to $R_{33}$ are individually a hydrogen atom or a C1-C6 alkyl group.

In some embodiments, the unsaturated C═C double bond-containing polyphenylene ether resin may comprise, but not limited to, a vinylbenzyl-containing polyphenylene ether resin with a number average molecular weight of about 1200 (such as OPE-2st 1200, available from Mitsubishi Gas Chemical Co., Inc.), a vinylbenzyl-containing polyphenylene ether resin with a number average molecular weight of about 2200 (such as OPE-2st 2200, available from Mitsubishi Gas Chemical Co., Inc.), a vinylbenzyl-containing polyphenylene ether resin with a number average molecular weight of about 2400 to 2800 (such as a vinylbenzyl-containing bisphenol A polyphenylene ether resin), a (meth)acryloyl-containing polyphenylene ether resin with a number average molecular weight about 1900 to 2300 (such as SA9000, available from Sabic), a vinyl-containing polyphenylene ether resin with a number average molecular weight of about 2200 to 3000, or a combination thereof. The vinyl-containing polyphenylene ether resin may include various polyphenylene ether resins disclosed in the US Patent Application Publication No. 20160185904A1, all of which are incorporated herein by reference in their entirety. The vinylbenzyl-containing polyphenylene ether resin may comprise, but not limited to, a vinylbenzyl-containing biphenyl polyphenylene ether resin, a vinylbenzyl-containing bisphenol A polyphenylene ether resin or a combination thereof.

In addition to the polyolefin, the homopolymer of Formula (1) and the unsaturated C═C double bond-containing polyphenylene ether resin, the resin composition of the present disclosure may further optionally comprise an unsaturated C═C double bond-containing crosslinking agent which comprises, but not limited to, 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof. These components should be construed as including their isomers or polymers.

Unless otherwise specified, relative to a total of 100 parts by weight of the polyolefin, the amount of the unsaturated C═C double bond-containing crosslinking agent may be 1 part by weight to 50 parts by weight, preferably 5 parts by weight to 30 parts by weight, and the ratio therebetween can be adjusted according to the need.

In addition to the polyolefin, the homopolymer of Formula (1) and the unsaturated C═C double bond-containing polyphenylene ether resin, the resin composition disclosed herein may further optionally comprise maleimide resin, benzoxazine resin, epoxy resin, organic silicone resin, cyanate ester resin, active ester, phenolic resin, amine curing agent, polyamide, polyimide or a combination thereof. These components should be construed as including their modifications.

Unless otherwise specified, relative to a total of 100 parts by weight of the polyolefin, any one of maleimide resin, benzoxazine resin, epoxy resin, organic silicone resin, cyanate ester resin, active ester, phenolic resin, amine curing agent, polyamide and polyimide as described above may range from 1 part by weight to 100 parts by weight, and the ratio therebetween can be adjusted according to the need.

The maleimide resin suitable for the present disclosure is not particularly limited and may include any one or more maleimide resins useful for preparing a prepreg, a resin film, a laminate or a printed circuit board. In some embodiments, the maleimide resin may comprise 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof. These components should be construed as including their modifications.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

Examples of the benzoxazine resin suitable for the present disclosure are not particularly limited and may comprise various benzoxazine resins known in the art to which this disclosure pertains; examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin, vinyl-containing benzoxazine resin, or a combination thereof. The diamino benzoxazine resin may include oxydianiline benzoxazine resin, diamino bisphenol F benzoxazine resin, diamino diphenyl benzoxazine resin, or a combination thereof. For example, the benzoxazine resin may be, but not limited to, LZ-8270, LZ-8280, LZ-8290 or LPY 11051 available from Huntsman, PF-3500 available from Chang Chun Plastics or HFB-2006M available from Showa High Polymer.

The epoxy resin suitable for the present disclosure may be any epoxy resin known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may comprise DOPO-containing phenol novolac epoxy resin, DOPO-containing cresol novolac epoxy resin, DOPO-containing bisphenol-A novolac epoxy resin, or a combination thereof, the DOPO-HQ epoxy resin may comprise DOPO-HQ-containing phenol novolac epoxy resin, DOPO-HQ-containing o-cresol novolac epoxy resin, DOPO-HQ-containing bisphenol-A novolac epoxy resin, or a combination thereof.

The organic silicone resin suitable for the present disclosure may be any organic silicone resin known in the field to which this disclosure pertains, including but not limited to polyalkylsiloxane, polyarylsiloxane, polyalkarylsiloxane, modified polysiloxane or a combination thereof. Preferably, the organic silicone resin suitable for the present disclosure is an amino-modified organic silicone resin, such as but not limited to amino-modified organic silicone resins KF-8010, X-22-161A, X-22-161B, KF-8012, KF-8008, X-22-9409, and X-22-1660B-3 available from Shin-Etsu Chemical Co., Ltd., amino-modified organic silicone resins BY-16-853U, BY-16-853, and BY-16-853B available from Toray-Dow coming Co., Ltd., amino-modified organic silicone resins XF42-C5742, XF42-C6252 and XF42-C5379 available from Momentive Performance Materials JAPAN LLC, or a combination thereof.

The cyanate ester resin suitable for the present disclosure is not particularly limited and may be any cyanate ester resin with an Ar—O—C≡N structure, wherein Ar represents a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin, or a combination thereof. The novolac cyanate ester resin may comprise bisphenol A novolac cyanate ester resin, bisphenol F novolac cyanate ester resin, phenol novolac cyanate ester resin or a combination thereof. For example, the cyanate ester resin may be available under the product name primaset PT-15, PT-30S, PT-60S, BA-200, BA-230S, BA-3000S, BTP-2500, BTP-6020S, DT-4000, DT-7000, ULL-950S, HTL-300, CE-320, LVT-50 or LeCy sold by Lonza.

The active ester suitable for the present disclosure may be any active polyester resin known in the field to which this disclosure pertains, including but not limited to various commercially available active polyester resin products. Examples include, but not limited to, active polyester resin products HPC-8000 and HPC-8150 available from D.I.C. Corporation.

The phenolic resin suitable for the present disclosure may comprise, but not limited to, mono-functional, bifunctional or multifunctional phenolic resin, comprising phenolic resin of a resin composition conventionally useful for making prepregs, such as phenol resin, phenoxy resin, novolac resin, etc. The novolac resin comprises phenol novolac resin, o-cresol novolac resin, or bisphenol A novolac resin.

The amine curing agent suitable for the present disclosure may include, but not limited to, diamino diphenyl sulfone, diamino diphenyl methane, diamino diphenyl ether, diamino diphenyl sulfide, dicyandiamide, or a combination thereof.

The polyamide suitable for the present disclosure may be any polyamide resin known in the field to which this disclosure pertains, including but not limited to various commercially available polyamide resin products.

The polyimide suitable for the present disclosure may be any polyimide resin known in the field to which this disclosure pertains, including but not limited to various commercially available polyimide resin products.

Moreover, in addition to the aforesaid components, the resin composition disclosed herein may optionally further comprise flame retardant, inorganic filler, curing accelerator, polymerization inhibitor, solvent, silane coupling agent, surfactant, coloring agent, toughening agent or a combination thereof.

Unless otherwise specified, the amount of flame retardant used in the present disclosure may be adjusted according to the need; for example, but not limited thereto, relative to 100 parts by weight of the polyolefin, the amount of flame retardant may be 1 to 100 parts by weight.

The flame retardant suitable for the present disclosure may be any one or more flame retardants useful for preparing a prepreg, a resin film, a laminate or a printed circuit board, examples including but not limited to bromine-containing flame retardant or phosphorus-containing flame retardant, the bromine-containing flame retardant preferably comprising decabromodiphenyl ethane, and the phosphorus-containing flame retardant preferably comprising: ammonium polyphosphate, hydroquinone bis-(diphenyl phosphate), bisphenol A bis-(diphenylphosphate), tri(2-carboxyethyl) phosphine (TCEP), phosphoric acid tris (chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives (such as di-DOPO compounds) or resins, DPPO (diphenylphosphine oxide) and its derivatives (such as di-DPPO compounds) or resins, melamine cyanurate, tri-hydroxy ethyl isocyanurate, aluminium phosphinate (e.g., commercially available OP-930 and OP-935) or a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac).

Unless otherwise specified, the amount of inorganic filler used in the present disclosure may be adjusted according to the need; for example, but not limited thereto, relative to 100 parts by weight of the polyolefin, the amount of inorganic filler may be 1 to 300 parts by weight, preferably 50 to 200 parts by weight and more preferably 120 to 170 parts by weight.

The inorganic filler suitable for the present disclosure may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, zinc molybdate-modified talc, zinc oxide, zirconium oxide, mica, boehmite (AlOOH), calcined talc, talc, silicon nitride, calcined kaolin or a combination thereof. Moreover, the inorganic filler can be spherical (including solid sphere or hollow sphere), fibrous, plate-like, particulate, flake-like or whisker-like and can be optionally pretreated by a silane coupling agent.

Unless otherwise specified, the amount of curing accelerator, polymerization inhibitor, silane coupling agent, surfactant and coloring agent used in the present disclosure may be adjusted according to the need; for example, but not limited thereto, relative to 100 parts by weight of the polyolefin, the amount of any one aforesaid component may be 1 to 20 parts by weight. Preferably, the amount of curing accelerator may be 0.5 to 5.0 parts by weight, preferably 0.8 to 1.0 part by weight.

The curing accelerator suitable for the present disclosure may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP) or a combination thereof. The Lewis acid may comprise metal salt compounds, such as those of manganese, iron, cobalt, nickel, copper and zinc, such as zinc octanoate or cobalt octanoate. The curing accelerator encompasses curing initiator such as a peroxide capable of producing free radicals, and examples of the curing initiator may comprise, but not limited to: dibenzoyl peroxide (BPO), dicumyl peroxide, 2,5-dimethyl-2,5-di(t-butylperoxy)hexane, 2,5-dimethyl-2,5-di(t-butylperoxy)-3-hexyne (25B), di-t-butyl peroxide, di(t-butylperoxyisopropyl)benzene, di(t-butylperoxy) phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di (benzoylperoxy)hexane, lauroyl peroxide, t-hexyl peroxypivalate, dibutylperoxyisopropylbenzene, bis(4-t-butylcyclohexyl) peroxydicarbonate or a combination thereof.

As used herein, the polymerization inhibitor is used to inhibit the polymerization reaction, and examples thereof are not particularly limited, which may include various molecule type polymerization inhibitors, stable free radical type polymerization inhibitors or a combination thereof known in the field to which this disclosure pertains. For example, molecule type polymerization inhibitors suitable for the present disclosure include but are not limited to phenols, quinones, arylamines, arene nitro compounds, sulfur-containing compounds, chlorides of metal with variable valency or a combination thereof; more specifically, molecule type polymerization inhibitors suitable for the present disclosure include but are not limited to phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or a combination thereof. For example, stable free radical type polymerization inhibitors suitable for the present disclosure include but are not limited to 1,1-diphenyl-2-picrylhydrazyl radical (DPPH), triphenylmethyl radical or a combination thereof.

The purpose of adding solvent to the resin composition according to the present disclosure is to dissolve the components in the resin composition so as to change the solid content of the resin composition and to adjust the viscosity of the resin composition. For example, the solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof.

The silane coupling agent suitable for the present disclosure may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane.

The purpose of adding surfactant to the resin composition according to the present disclosure is to ensure uniform distribution of the inorganic filler in the resin composition.

The coloring agent suitable for the present disclosure may comprise, but not limited to, dye or pigment.

Unless otherwise specified, the amount of toughening agent used in the present disclosure may be adjusted according to the need; for example, but not limited thereto, relative to 100 parts by weight of the polyolefin, the amount of toughening agent may be 5 to 50 parts by weight.

The purpose of toughening agent used herein is to improve the toughness of the resin composition. The toughening agent may comprise, but not limited to, carboxyl-terminated butadiene acrylonitrile rubber (CTBN rubber), core-shell rubber, etc.

The resin compositions of various embodiments of the present disclosure may be processed by various methods into different articles, including but not limited to a prepreg, a resin film, a laminate or a printed circuit board.

For example, the resin compositions of various embodiments may be used to make prepregs.

In one embodiment, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 120° C. to 180° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

In one embodiment, by well mixing each resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

For example, the article made from the resin composition disclosed herein may be a resin film which is prepared by heating and baking the resin composition to the semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

For example, the resin composition of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment, the laminate may be further processed by trace formation processes to obtain a printed circuit board.

In one embodiment of making the printed circuit board according to the present disclosure, a double-sided copper-clad laminate (such as product EM-827, available from Elite Material Co., Ltd.) with a thickness of 28 mil and having a 1-ounce (oz) HTE (high temperature elongation) copper foil may be used and subjected to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly containing a copper foil, the prepreg, the inner layer circuit board, the prepreg and a copper foil stacked in said order by heating at 190 to 220° C. for 90 to 180 minutes to cure the insulation material of the prepreg. Next, black oxidation, drilling, copper plating and other known circuit board processes are performed on the outmost copper foils so as to obtain the printed circuit board.

In one or more embodiments, the resin composition of the present disclosure and various articles made therefrom may preferably have any one, more or all of the following properties.

In one embodiment, the glass transition temperature of the article as measured by using a dynamic mechanical analyzer by reference to IPC-TM-650 2.4.24.4 is greater than or equal to 250° C., such as between 250° C. and 296° C.

In one embodiment, no delamination occurs after subjecting the article to a multi-layer board thermal resistance test by reference to IPC-TM-650 2.4.13.1.

In one embodiment, no delamination occurs after subjecting the article to a thermal resistance after moisture absorption test by reference to IPC-TM-650 2.6.16.1 and IPC-TM-650 2.4.23.

In one embodiment, the Z-axis ratio of thermal expansion as measured by reference to IPC-TM-650 2.4.24.5 is less than or equal to 0.40%, such as between 0.26% and 0.40%.

In one embodiment, the article has a dissipation factor Df at 10 GHz as measured by reference to JIS C2565 of less than or equal to 0.0017, such as between 0.0013 and 0.0017.

The resin compositions of various Examples (Table 1) and Comparative Examples (Table 2) of the present disclosure are formulated and further fabricated to prepare test samples or articles.

The names of reagents used in the Examples and Comparative Examples are as follows:
1. polybutadiene: product name B-3000, available from Nippon Soda Co., Ltd.
2. hydrogenated styrene-butadiene block copolymer: product name G1726, available from Kraton Corporation.
3. styrene-butadiene-maleic anhydride terpolymer: product name Ricon184MA6, available from Cray Valley.
4. styrene-butadiene random copolymer: product name Ricon 100, available from Cray Valley.
5. homopolymer of vinylbenzocyclobutene (PVBCB): prepared by the Applicant, having a molecular weight of about 800, 1000, 4000, 20000 and 50000, respectively.
6. homopolymer of acryloylbenzocyclobutene (PABCB): prepared by the Applicant, having a molecular weight of about 1000.
7. homopolymer of vinylbenzylbenzocyclobutene (PVBBCB): prepared by the Applicant, having a molecular weight of about 1000.
8. vinylbenzocyclobutene (VBCB): available from Chemtarget Technologies Co., Ltd.
9. acryloylbenzocyclobutene (ABCB): prepared by the Applicant.
10. vinylbenzylbenzocyclobutene (VBBCB): prepared by the Applicant.
11. benzocyclobutene (BCB): available from Chemtarget Technologies Co., Ltd.
12. methacryloyl-containing polyphenylene ether resin: product name SA9000, available from Sabic.
13. vinylbenzyl-containing polyphenylene ether resin: product name OPE-2st 1200, available from Mitsubishi Gas Chemical Co., Inc.
14. triallyl isocyanurate: product name TAIC, available from Kingyorker Enterprise Co., Ltd.
15. inorganic filler: spherical silica, product name SC2500-SVJ, available from Admatechs.
16. curing accelerator: 2,5-dimethyl-2,5-di(t-butylperoxy)-3-hexyne, product name 25B, available from NOF Corporation.
17. solvent: toluene, available from Sinopec Group.

A proper amount (abbreviated as "PA") in Tables 1-2 represents an amount of solvent suitable for obtaining a desired solid content for the resin composition, such as a solid content of the varnish in Tables 1-2 being 62 wt %.

The reagents prepared by the Applicant used in the Examples and Comparative Examples are described as follows:

Preparation Example 1

Preparation of Acryloylbenzocyclobutene (ABCB)

In an iced water bath, benzocyclobutene and acryloyl chloride in a molar ratio of 1:0.9 and a proper amount of dichloromethane were mixed well and dissolved and then added together with a highly active catalyst (such as but not limited to anhydrous aluminium trichloride) to a reaction flask, the temperature was increased to 40° C. for reflux for 4 hours, followed by filtration to remove the catalyst and rotary evaporation to remove dichloromethane and acryloyl chloride, and then washed with n-hexane for several times before being placed in a drying oven at 30° C. for 12 hours to obtain the product acryloylbenzocyclobutene ABCB.

Preparation Example 2

Preparation of Vinylbenzylbenzocyclobutene (VBBCB)

In an iced water bath, benzocyclobutene and chloromethyl styrene in a molar ratio of 1:0.8 and a proper amount of dichloromethane were mixed well and dissolved and then added together with a highly active catalyst (such as but not limited to anhydrous aluminium trichloride) to a reaction flask, the temperature was increased to 40° C. for reflux for 6 hours, followed by filtration to remove the catalyst and rotary evaporation to remove dichloromethane, and then washed with n-hexane for several times before being placed in a drying oven at 30° C. for 12 hours to obtain the product vinylbenzylbenzocyclobutene VBBCB.

Preparation Example 3

Preparation of Homopolymer of Vinylbenzocyclobutene (PVBCB)

To a schlenck reaction flask, 0.5 mole of vinylbenzocyclobutene monomer and 0.01 mole of 2,2,6,6-tetramethylpiperidine 1-oxyl were added (the main purpose of adding 2,2,6,6-tetramethylpiperidine 1-oxyl is to control the polymerization rate and prevent the polymerization reaction from being too fast, so as to obtain a product with a desired molecular weight; after treatment of the crude product with a methanol solution, 2,2,6,6-tetramethylpiperidine 1-oxyl will be removed from and will be no longer present in the product). After that, the reaction flask was placed in liquid nitrogen for freezing for 2 minutes, followed by three repetitions of vacuum pumping for 5 minutes and introducing argon gas to fully remove oxygen in the flask; then the reaction flask was placed in an oil bath at 130° C. for reaction for 24 hours to obtain a crude polymerized product of vinylbenzocyclobutene, wherein the reaction was an active free radical polymerization reaction in which polymerized products of different molecular weights may be obtained at different reaction time points; under stirring, the crude product was added dropwise to the methanol solution and then stirring for 0.5 hour after addition, followed by filtration and vacuum drying to obtain the final product, a homopolymer of vinylbenzocyclobutene (PVBCB), as represented by Formula (12), wherein R1, R2 and Q1 are each a hydrogen atom; the number average molecular weight Mn of the product was about 4000 as calculated by the GPC test.

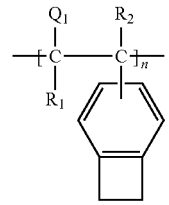

Formula (12)

The GPC spectrum of PVBCB (Mn≈4000) is illustrated in the sole FIGURE.

Following the same processes as described above but with the reaction time changed to 6 hours, 9 hours, 72 hours and 100 hours so as to obtain the PVBCB as represented by Formula (12) with the molecular weight of Mn≈800, Mn≈1000, Mn≈20000 and Mn≈50000, respectively.

Preparation Example 4

Preparation of Homopolymer of Acryloylbenzocyclobutene (PABCB)

Using the same processes as described in Preparation Example 3 except that the vinylbenzocyclobutene monomer was replaced by the acryloylbenzocyclobutene Monomer and the Reaction Time Controlled at 9 Hours, a Homopolymer of acryloylbenzocyclobutene PABCB (Mn≈1000) as represented by Formula (13) was obtained, wherein R3, R4, and R5 are each a hydrogen atom.

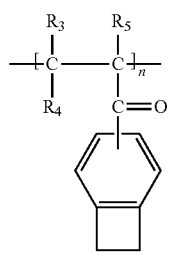

Formula (13)

Preparation Example 5

Preparation of Homopolymer of Vinylbenzylbenzocyclobutene (PVBBCB)

Using the same processes as described in Preparation Example 3 except that the vinylbenzocyclobutene monomer was replaced by the vinylbenzylbenzocyclobutene monomer and the reaction time controlled at 9 hours, a homopolymer of vinylbenzylbenzocyclobutene PVBBCB (Mn≈1000) as represented by Formula (14) was obtained, wherein R6, R7, and R8 are each a hydrogen atom, and Q2 is a methylene group.

Formula (14)

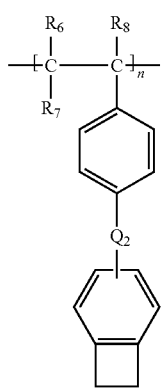

For the property tests of Examples E1 to E13 and Comparative Examples C1 to C7 listed in Table 3 and Table 4, samples (specimens) were prepared as described below and tested under specified conditions as follows.

1. Prepreg: Resin composition from each Example (Table 1) or each Comparative Example (Table 2) was individually well-mixed to form a varnish (solid content of 62 wt %), which was then loaded to an impregnation tank; a fiberglass fabric (e.g., 2116 L-glass fiber fabric or 1078 L-glass fiber fabric, all available from Asahi) was impregnated into the impregnation tank to adhere the resin composition onto the fiberglass fabric, followed by heating at 130° C. to 170° C. to a semi-cured stage (B-stage) to obtain a prepreg.

2. Copper-clad laminate (6-ply, formed by lamination of six prepregs): Two 18 μm HVLP (hyper very low profile) copper foils and six prepregs obtained from 2116 L-glass fiber fabrics impregnated with each Example or Comparative Example and having a resin content of about 55% were prepared and stacked in the order of one HVLP copper foil, six prepregs and one HVLP copper foil, followed by lamination under vacuum at 420 psi and 200° C. for 2 hours to form a copper-clad laminate. Insulation layers between the two copper foils were formed by laminating and curing six sheets of prepreg, and the resin content of the insulation layers is about 55%.

3. Copper-free laminate (6-ply, formed by lamination of six prepregs): Each aforesaid copper-clad laminate was etched to remove the two copper foils to obtain a copper-free laminate (6-ply), which was formed by laminating six sheets of prepreg and had a resin content of about 55%.

4. Copper-free laminate (2-ply, formed by lamination of two prepregs): Two 18 μm HVLP (hyper very low profile) copper foils and two prepregs obtained from 1078 L-glass fiber fabrics impregnated with each Example or Comparative Example were prepared and stacked in the order of one copper foil, two prepregs and one copper foil, followed by lamination under vacuum at 420 psi and 200° C. for 2 hours to form a copper-clad laminate (2-ply, formed by lamination of two prepregs). Next, each copper-clad laminate was etched to remove the copper foils on both sides to obtain a copper-free laminate (2-ply) which is formed by laminating two prepregs and has a resin content of about 70%.

Each sample was analyzed as described below.

1. Glass Transition Temperature (Tg)

A copper-free laminate sample (6-ply) was subjected to the glass transition temperature measurement. A dynamic mechanical analyzer (DMA) was used by reference to IPC-TM-650 2.4.24.4 "Glass Transition and Modulus of Materials Used in High Density Interconnection (HDI) and Microvias-DMA Method" to measure the glass transition temperature (° C.) of each sample. Temperature interval during the measurement was set at 50-400° C. with a temperature increase rate of 2° C./minute; higher glass transition temperature is more preferred.

2. Multi-Layer Board Thermal Resistance

A core was prepared as follow: a prepreg (resin content of about 55%) prepared from a 2116 L-glass fiber fabric impregnated with each Example or each Comparative Example was superimposed on both sides with a piece of 18 μm HVLP copper foil, followed by lamination and curing for 2 hours under vacuum at high temperature (200° C.) and high pressure (420 psi) to obtain a copper-clad core. Then the copper-clad core obtained above was etched to remove the copper foils on both sides so as to obtain a copper-free core (5 mil in thickness). Three copper-free cores were prepared as above. Next, two 18 μm HVLP copper foils and eight prepregs (resin content of about 70%) obtained from 1078 L-glass fiber fabrics impregnated with each Example or Comparative Example were prepared and stacked in the order of one copper foil, two prepregs (obtained from 1078 L-glass fiber fabrics), one copper-free core, two prepregs (obtained from 1078 L-glass fiber fabrics), one copper-free core, two prepregs (obtained from 1078 L-glass fiber fabrics), one copper-free core, two prepregs (obtained from 1078 L-glass fiber fabrics), and one copper foil, followed by lamination under vacuum at 420 psi and 200° C. for 2 hours to form an eight-layer copper-clad laminate. The eight-layer copper-clad laminate was then cut to form a 5.9 inch*2.2 inch rectangular sample, the sample was subjected to a circuit board drilling process to form a total of 500 through holes with a diameter of 0.3 mm (i.e., a 20*25 array of through holes, the vertical distance of adjacent hole walls being 0.25 mm), and then the hole walls were copper-plated to obtain a sample for multi-layer board thermal resistance test.

In the multi-layer board thermal resistance test, the aforesaid sample for multi-layer board thermal resistance test was horizontally placed on (i.e., in contact with) the solder bath of a 288° C. solder pot by reference to IPC-TM-650 2.4.13.1; during each test, one surface of the sample was placed on the solder bath for 10 seconds and then removed therefrom and cooled at room temperature for 30 seconds, and then the same surface of the sample was placed on the solder bath for 10 seconds again and then removed and cooled at room temperature for 30 seconds. Each 10 seconds on the solder bath plus 30 seconds of cooling at room temperature was taken as one cycle, and a total of 10 cycles were repeated. Three identical specimens were tested for each Example or Comparative Example. The sample was sectioned and observed with an optical microscope to determine the presence or absence of delamination. Absence of delamination after 10 floating cycles of all three specimens is designated as "pass" to represent no delamination; presence of delamination after 10 floating cycles of any one specimen is designated as "NG" to represent delamination. As used herein, delamination may refer to interlayer separation or blistering. Delamination may occur between any layers of a laminate. For example, interlayer separation between insulation layers is considered as delamination; for example, blistering or separation between a copper foil and an insulation layer is also considered as delamination. A multi-layer board includes multiple layers of copper foil and has been subjected to a circuit board drilling process, so the result of its thermal resistance test may more accurately reflect the thermal resistance of a printed circuit board; in contrast, the result of thermal resistance test of an ordinary two-layer board without being subjected to a circuit board drilling process fails to accurately predict the thermal resistance of a multi-layer board and thereof fails to predict the thermal resistance of a printed circuit board.

3. Thermal Resistance after Moisture Absorption (Pressure Cooking Test, PCT)

The aforesaid copper-free laminate (6-ply) was used as the sample and subjected to the thermal resistance after moisture absorption test. By reference to IPC-TM-650 2.6.16.1, the sample was subjected to a pressure cooking test (PCT) for 5 hours of moisture absorption (at a temperature of 121° C. and a relative humidity of 100%), followed by reference to IPC-TM-650 2.4.23 and immersed into a 288° C. solder bath for 20 seconds, removed and then inspected to determine the absence or presence of delamination; each Example or Comparative Example was evaluated by testing three identical samples, and a designation of "X" was given to represent delamination in any sample, indicating interlayer separation or blistering of the insulation layers of the laminate. The absence of delamination, which represents pass (designation of "0"), means no interlayer delamination and blistering occurs between insulation layers. 000 represents no delamination in all three samples, XXX represents delamination in all three samples, and OXX represents no delamination in one sample and delamination in two samples.

4. Z-Axis Ratio of Thermal Expansion (a.k.a. Percent Thermal Expansion, Z-Axis, Z-PTE)

The copper-free laminate (6-ply) sample was subjected to thermal mechanical analysis (TMA) during the measurement of the Z-axis ratio of thermal expansion. Each sample was heated from 50° C. to 260° C. at a heating rate of 10° C./minute and then subjected to the measurement of the percent (%) of thermal expansion in Z-axis in a temperature range of 50° C. to 260° C. by reference to IPC-TM-650 2.4.24.5. Lower Z-axis ratio of thermal expansion represents a better property of the sample.

5. Dissipation Factor (Df)

In the dissipation factor measurement, the copper-free laminate (2-ply) sample was tested by using a microwave dielectrometer available from AET Corp. by reference to JIS C2565 at 10 GHz for analyzing each sample. Lower dissipation factor represents better dielectric properties of the sample. Under a 10 GHz frequency, for a Df value of less than 0.0030, a difference in Df of less than 0.0001 represents no substantial difference in dissipation factor in different laminates, and a difference in Df value of greater than or equal to 0.0001 represents a substantial difference (i.e., significant technical difficulty) in dissipation factor in different laminates.

TABLE 1

Resin compositions of Examples E1 to E13 (in part by weight)

| Composition | | E1 | E2 | E3 | E4 | E5 |
|---|---|---|---|---|---|---|
| polyolefin | B-3000 | 100 | 100 | 100 | 100 | 100 |
| | G1726 | | | | | |
| | Ricon184MA6 | | | | | |
| | Ricon100 | | | | | |
| homopolymer of Formula (1) | PVBCB(Mn ≈ 800) | 100 | | | | |
| | PVBCB(Mn ≈ 1000) | | 100 | | | |
| | PVBCB(Mn ≈ 4000) | | | 100 | | |
| | PVBCB(Mn ≈ 20000) | | | | 100 | |
| | PVBCB(Mn ≈ 50000) | | | | | 100 |
| | PABCB(Mn ≈ 1000) | | | | | |
| | PVBBCB(Mn ≈ 1000) | | | | | |
| vinylbenzocyclobutene | VBCB | | | | | |
| acryloylbenzocyclobutene | ABCB | | | | | |
| vinylbenzylbenzocyclobutene | VBBCB | | | | | |
| benzocyclobutene | BCB | | | | | |
| unsaturated C=C double bond-containing polyphenylene ether resin | SA9000 | | | | | |
| | OPE-2st 1200 | | | | | |
| unsaturated C=C double bond-containing crosslinking agent | TAIC | | | | | |
| inorganic filler | SC-2500-SVJ | 120 | 120 | 120 | 120 | 120 |
| solvent | toluene | PA | PA | PA | PA | PA |
| curing accelerator | 25B | 0.8 | 0.8 | 0.8 | 0.8 | 0.8 |

| Composition | E6 | E7 | E8 | E9 | E10 | E11 | E12 | E13 |
|---|---|---|---|---|---|---|---|---|
| B-3000 | 100 | 100 | 100 | 100 | 100 | | 20 | 40 |
| G1726 | | | | | | | | 10 |
| Ricon184MA6 | | | | | | | | 10 |
| Ricon100 | | | | | | 100 | 80 | 40 |
| PVBCB(Mn ≈ 800) | | | | | | | | |
| PVBCB(Mn ≈ 1000) | | | | | | | | |
| PVBCB(Mn ≈ 4000) | | | 20 | 30 | 150 | 100 | 100 | 100 |
| PVBCB(Mn ≈ 20000) | | | | | | | | |
| PVBCB(Mn ≈ 50000) | | | | | | | | |
| PABCB(Mn ≈ 1000) | 100 | | | | | | | 10 |
| PVBBCB(Mn ≈ 1000) | | 100 | | | | | | 10 |

TABLE 1-continued

Resin compositions of Examples E1 to E13 (in part by weight)

| | | | | | | | | |
|---|---|---|---|---|---|---|---|---|
| VBCB | | | | | | | | |
| ABCB | | | | | | | | |
| VBBCB | | | | | | | | |
| BCB | | | | | | | | |
| SA9000 | | | | | | 80 | 100 | 40 |
| OPE-2st 1200 | | | | | | | | 10 |
| TAIC | | | | | | | | 10 |
| SC-2500-SVJ | 120 | 120 | 120 | 120 | 120 | 120 | 120 | 170 |
| toluene | PA | PA | PA | PA | PA | PA | PA | PA |
| 25B | 0.8 | 0.8 | 0.8 | 0.8 | 0.8 | 0.8 | 0.8 | 1.0 |

TABLE 2

Resin compositions of Comparative Examples C1 to C7 (in part by weight)

| Composition | | C1 | C2 | C3 | C4 | C5 | C6 | C7 |
|---|---|---|---|---|---|---|---|---|
| polyolefin | B-3000 | 100 | 100 | 100 | 100 | 100 | 20 | |
| | G1726 | | | | | | | |
| | Ricon184MA6 | | | | | | | |
| | Ricon100 | | | | | | 80 | 100 |
| homopolymer of Formula (1) | PVBCB(Mn ≈ 800) | | | | | | | |
| | PVBCB(Mn ≈ 1000) | | | | | | | |
| | PVBCB(Mn ≈ 4000) | | | | | | | |
| | PVBCB(Mn ≈ 20000) | | | | | | | |
| | PVBCB(Mn ≈ 50000) | | | | | | | |
| | PABCB(Mn ≈ 1000) | | | | | | | |
| | PVBBCB(Mn ≈ 1000) | | | | | | | |
| vinylbenzocyclobutene | VBCB | 100 | | | | | | 100 |
| acryloylbenzocyclobutene | ABCB | | 100 | | | | | |
| vinylbenzylbenzocyclobutene | VBBCB | | | 100 | | | | |
| benzocyclobutene | BCB | | | | 100 | | | |
| unsaturated C=C double bond-containing polyphenylene ether resin | SA9000 | | | | | | 100 | 80 |
| | OPE-2st 1200 | | | | | | | |
| unsaturated C=C double bond-containing crosslinking agent | TAIC | | | | | | | |
| inorganic filler | SC-2500-SVJ | 120 | 120 | 120 | 120 | 120 | 120 | 120 |
| solvent | toluene | PA | PA | PA | PA | PA | PA | PA |
| curing accelerator | 25B | 0.8 | 0.8 | 0.8 | 0.8 | 0.8 | 0.8 | 0.8 |

TABLE 3

Test results of articles made from resin compositions of Examples E1 to E13

| Property | Unit | E1 | E2 | E3 | E4 | E5 | E6 | E7 |
|---|---|---|---|---|---|---|---|---|
| DMA-Tg | °C. | 255 | 272 | 275 | 273 | 251 | 270 | 274 |
| multi-layer board thermal resistance | / | pass | pass | pass | pass | pass | pass | pass |
| PCT | / | OOO | OOO | OOO | OOO | OOO | OOO | OOO |
| Z-PTE | % | 0.38 | 0.30 | 0.31 | 0.30 | 0.40 | 0.34 | 0.32 |
| Df @ 10 GHz | / | 0.0017 | 0.0015 | 0.0015 | 0.0015 | 0.0015 | 0.0015 | 0.0015 |

| Property | E8 | E9 | E10 | E11 | E12 | E13 |
|---|---|---|---|---|---|---|
| DMA-Tg | 250 | 270 | 296 | 274 | 275 | 280 |
| multi-layer board thermal resistance | pass | pass | pass | pass | pass | pass |
| PCT | OOO | OOO | OOO | OOO | OOO | OOO |
| Z-PTE | 0.40 | 0.33 | 0.26 | 0.32 | 0.38 | 0.32 |
| Df @ 10 GHz | 0.0015 | 0.0015 | 0.0013 | 0.0016 | 0.0016 | 0.0016 |

TABLE 4

Test results of articles made from resin compositions of Comparative Examples C1 to C7

| Property | Unit | C1 | C2 | C3 | C4 | C5 | C6 | C7 |
|---|---|---|---|---|---|---|---|---|
| DMA-Tg | ° C. | 16 | 15 | 14 | 15 | 15 | 175 | 172 |
| multi-layer board thermal resistance | / | NG | NG | NG | NG | NG | NG | NG |
| PCT | / | XXX | OXX | OXX | XXX | OXX | OXX | OXX |
| Z-PTE | % | 2.6 | 2.5 | 2.6 | 2.5 | 2.6 | 2.5 | 2.6 |
| Df @ 10 GHz | / | 0.0023 | 0.0023 | 0.0022 | 0.0023 | 0.0021 | 0.0025 | 0.0025 |

The following observations can be made from Table 1 to Table 4.

Comparison of Examples E1-E10 with Comparative Example C5 and Example E12 with Comparative Example C6 shows that E1-E10 and E12, due to the inclusion of the homopolymer of Formula (1), have a greatly increased glass transition temperature and, unlike C5 and C6, show no delamination in the multi-layer board thermal resistance test and the thermal resistance after moisture absorption test, have lower Z-axis ratio of thermal expansion and dissipation factor and achieve excellent thermal resistance, dimensional stability and dielectric properties.

In contrast to Comparative Examples C1-C4 using a monomer of Formula (1), Examples E1-E7 use the homopolymer of Formula (1), and Example E11 uses the homopolymer of Formula (1) in contrast to Comparative Example C7 which uses a monomer of Formula (1), it can be observed that ET-E7 and E11 have a greatly increased glass transition temperature and, unlike C1-C4 and C7, show no delamination in the multi-layer board thermal resistance test and the thermal resistance after moisture absorption test, have lower Z-axis ratio of thermal expansion and dissipation factor and achieve excellent thermal resistance, dimensional stability and dielectric properties.

In contrast to Examples E3 and E9-E10 which comprise 30 parts by weight to 150 parts by weight of the homopolymer of Formula (1), E8 comprises 20 parts by weight of the homopolymer of Formula (1), and it can be observed that the reduction of the amount of the homopolymer of Formula (1) is to a certain extent associated to the lowering of the glass transition temperature and the increasing of the Z-axis ratio of thermal expansion, but no delamination occurs in the multi-layer board thermal resistance test and the thermal resistance after moisture absorption test, and the dielectric properties are still desirable.

In contrast to Examples E2-E4 which include a homopolymer of vinylbenzocyclobutene (PVBCB) having a number average molecular weight Mn of about 1000-20000, Example E1 uses a PVBCB with Mn of about 800 and Example E5 uses a PVBCB with Mn of about 50000; it can be observed that E1 and E5 do not occur delamination in the multi-layer board thermal resistance test and the thermal resistance after moisture absorption test, but to a certain extent the glass transition temperature is lowered and the Z-axis ratio of thermal expansion is increased, reflecting the deterioration in the thermal resistance and the dimensional stability.

Example E13 further includes an unsaturated C=C double bond-containing polyphenylene ether resin and an unsaturated C=C double bond-containing crosslinking agent (TAIC), and it can be observed that no delamination occurs in the multi-layer board thermal resistance test and the thermal resistance after moisture absorption test, the dielectric properties are good, the glass transition temperature is higher, and the Z-axis ratio of thermal expansion is lower, better satisfying the demands in thermal resistance and dimensional stability.

The above detailed description is merely illustrative in nature and is not intended to limit the embodiments of the subject matter or the applications and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A resin composition, based on 100 parts by weight of a polyolefin, comprising:
   (A) 100 parts by weight of the polyolefin; and
   (B) 20 parts by weight to 150 parts by weight of a homopolymer of Formula (1), Formula (1)

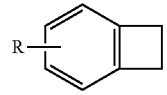

wherein R is a functional group containing an unsaturated C=C double bond; and wherein the polyolefin comprises polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, styrene-maleic anhydride copolymer, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof.

2. The resin composition of claim 1, comprising 30 parts by weight to 150 parts by weight of the homopolymer of Formula (1).

3. The resin composition of claim 1, wherein the homopolymer of Formula (1) has a number average molecular weight of 800 to 50000.

4. The resin composition of claim 1, wherein the homopolymer of Formula (1) has a number average molecular weight of 1000 to 20000.

5. The resin composition of claim 1, wherein the homopolymer of Formula (1) comprises a homopolymer of Formula (2), a homopolymer of Formula (3), a homopolymer of Formula (4) or a combination thereof:

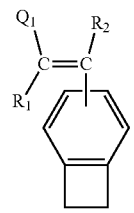

Formula (2)

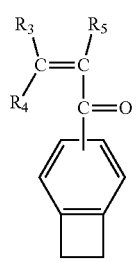

Formula (3)

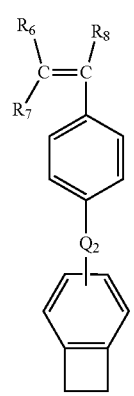

Formula (4)

wherein $R_1$, $R_2$, $R_3$, $R_4$, $R_5$, $R_6$, $R_7$ and $R_8$ independently represent a hydrogen atom, a methyl group or an ethyl group;

$Q_1$ is a hydrogen atom, a C1-C10 straight chain hydrocarbyl group, a C1-C10 branched chain hydrocarbyl group or a C3-C10 cyclic hydrocarbyl group;

$Q_2$ is a C1-C10 straight chain hydrocarbyl group, a C1-C10 branched chain hydrocarbyl group or a C3-C10 cyclic hydrocarbyl group.

6. The resin composition of claim 1, further comprising 50 parts by weight to 100 parts by weight of an unsaturated C=C double bond-containing polyphenylene ether resin which comprises a vinylbenzyl-containing polyphenylene ether resin, a (meth)acryloyl-containing polyphenylene ether resin, a vinyl-containing polyphenylene ether resin or a combination thereof.

7. The resin composition of claim 1, further comprising an unsaturated C=C double bond-containing crosslinking agent which comprises 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

8. The resin composition of claim 1, further comprising maleimide resin, benzoxazine resin, epoxy resin, organic silicone resin, cyanate ester resin, active ester, phenolic resin, amine curing agent, polyamide, polyimide or a combination thereof.

9. The resin composition of claim 1, further comprising flame retardant, curing accelerator, polymerization inhibitor, inorganic filler, solvent, silane coupling agent, surfactant, coloring agent, toughening agent or a combination thereof.

10. An article made from the resin composition of claim 1, wherein the article comprises a prepreg, a resin film, a laminate, or a printed circuit board.

11. The article of claim 10, which has a glass transition temperature as measured by using a dynamic mechanical analyzer by reference to IPC-TM-650 2.4.24.4 of greater than or equal to 250° C.

12. The article of claim 10, which has a Z-axis ratio of thermal expansion as measured by reference to IPC-TM-650 2.4.24.5 of less than or equal to 0.40%.

13. The article of claim 10, which has a dissipation factor Df at 10 GHz as measured by reference to JIS C2565 of less than or equal to 0.0017.

14. The article of claim 10, characterized in that no delamination occurs after subjecting the article to a thermal resistance after moisture absorption test by reference to IPC-TM-650 2.6.16.1 and IPC-TM-650 2.4.23.

15. The article of claim 10, characterized in that no delamination occurs after subjecting the article to a multi-layer board thermal resistance test by reference to IPC-TM-650 2.4.13.1.

* * * * *